(12) United States Patent
Holzherr et al.

(10) Patent No.: US 9,883,700 B2
(45) Date of Patent: Feb. 6, 2018

(54) AEROSOL-GENERATING DEVICE AND SYSTEM

(71) Applicant: Philip Morris Products S.A., Neuchatel (CH)

(72) Inventors: Raphael Holzherr, Fontaines (CH); Keethan Dasnavis Fernando, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/504,498

(22) PCT Filed: Aug. 12, 2015

(86) PCT No.: PCT/EP2015/068607
§ 371 (c)(1),
(2) Date: Feb. 16, 2017

(87) PCT Pub. No.: WO2016/026756
PCT Pub. Date: Feb. 25, 2016

(65) Prior Publication Data
US 2017/0231285 A1    Aug. 17, 2017

(30) Foreign Application Priority Data
Aug. 21, 2014    (EP) .................................... 14181846

(51) Int. Cl.
*A24F 13/22*    (2006.01)
*A24F 47/00*    (2006.01)
(Continued)

(52) U.S. Cl.
CPC .............. *A24F 47/008* (2013.01); *A24F 9/16* (2013.01); *B65D 43/14* (2013.01); *H02J 7/0045* (2013.01)

(58) Field of Classification Search
USPC ................. 131/328, 329, 330; 320/113, 115
See application file for complete search history.

(56) References Cited

U.S. PATENT DOCUMENTS 3,143,697 A * 8/1964 Springer ................ A61C 17/22
                                                      206/362.1
3,781,495 A * 12/1973 Splingaerd ........... H01R 13/707
                                                      174/67
(Continued)

FOREIGN PATENT DOCUMENTS

| CN | 203072895 U | 7/2013 |
| CN | 203318894 U | 12/2013 |
| WO | WO 2013/10261 A2 | 7/2013 |

OTHER PUBLICATIONS

International Search Report and Written Opinion dated Dec. 14, 2015 in PCT/EP2015/068607, filed Aug. 12, 2015.

*Primary Examiner* — Neil Abrams
(74) *Attorney, Agent, or Firm* — Oblon, McClelland, Maier & Neustadt, L.L.P.

(57) ABSTRACT

An electrically heated aerosol-generating system is provided, including a primary device and a secondary, aerosol-generating, device having a cavity at a proximal end configured to removably receive an aerosol-generating substrate. The primary device includes a housing; a power supply; a cavity in the housing configured to receive the secondary device; a plurality of electrical contacts within the cavity, each contact being configured to contact a corresponding contact of the secondary device when the secondary device is in the cavity, at least one of the contacts being connected to the power supply; and a lid configured to cover an opening of the cavity, and being moveable between a first closed position, and a second open position. The lid includes (Continued)

a protrusion configured to prevent movement from the second position to the first position if the secondary device is inserted incorrectly.

7 Claims, 2 Drawing Sheets

(51) Int. Cl.
  *A24F 9/16* (2006.01)
  *H02J 7/00* (2006.01)
  *B65D 43/14* (2006.01)

(56) References Cited

U.S. PATENT DOCUMENTS

| | | | | |
|---|---|---|---|---|
| 4,612,491 A * | 9/1986 | McCarty | | H02J 7/0042 320/107 |
| 4,947,875 A * | 8/1990 | Brooks | | A24F 47/006 128/202.21 |
| 5,111,360 A * | 5/1992 | Baba | | B60R 11/0241 361/727 |
| 5,310,998 A * | 5/1994 | Okuno | | G06F 13/4081 235/380 |
| 5,396,396 A * | 3/1995 | Watanabe | | H01H 3/161 200/50.14 |
| 5,762,512 A * | 6/1998 | Trant | | H01M 2/1055 320/114 |
| 5,934,289 A * | 8/1999 | Watkins | | A24F 47/008 128/202.21 |
| 9,032,968 B2 * | 5/2015 | Glasberg | | A24F 47/008 131/273 |
| 9,220,304 B2 * | 12/2015 | Greim | | A24F 47/008 |
| 9,499,332 B2 * | 11/2016 | Fernando | | A24F 47/008 |
| 9,603,388 B2 * | 3/2017 | Fernando | | A24F 47/008 |
| 2009/0283103 A1 * | 11/2009 | Nielsen | | A24F 1/30 131/273 |
| 2010/0313901 A1 * | 12/2010 | Fernando | | A24F 47/008 131/330 |
| 2014/0348495 A1 | 11/2014 | Greim | | |
| 2014/0374289 A1 | 12/2014 | Liu | | |
| 2017/0214261 A1 * | 7/2017 | Gratton | | H02J 7/0044 |
| 2017/0231285 A1 * | 8/2017 | Holzherr | | A24F 47/008 131/329 |

* cited by examiner

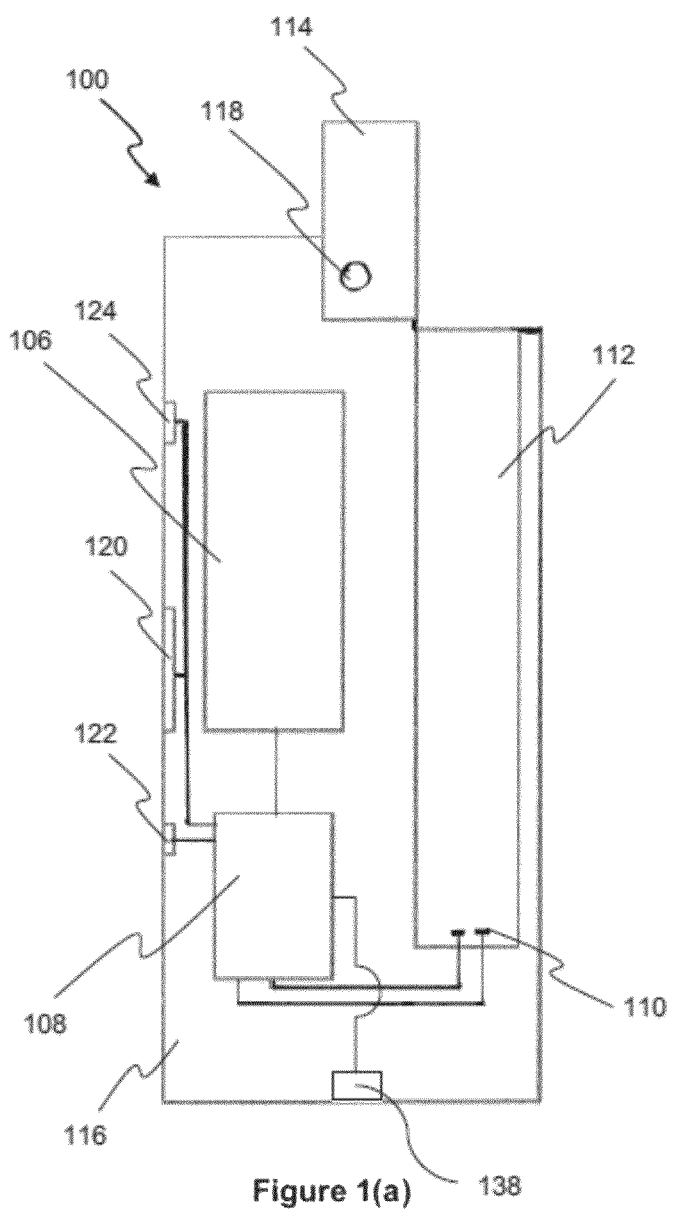
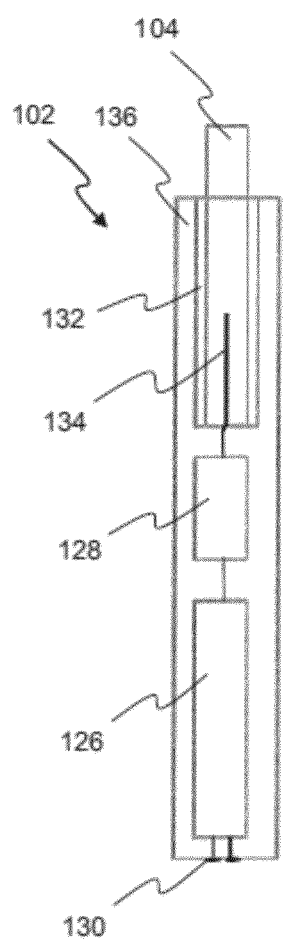
Figure 1(a)
Figure 1(b)

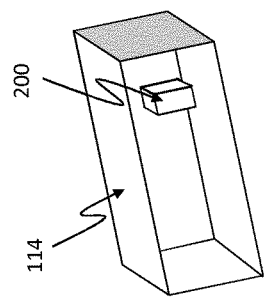
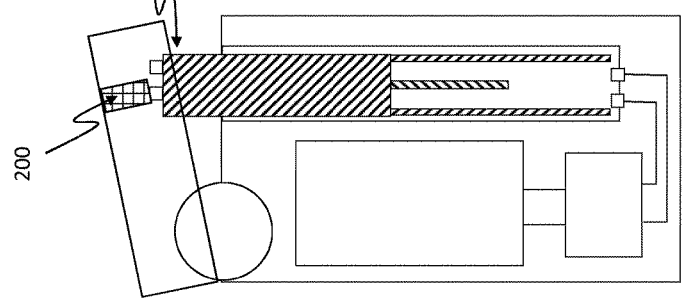
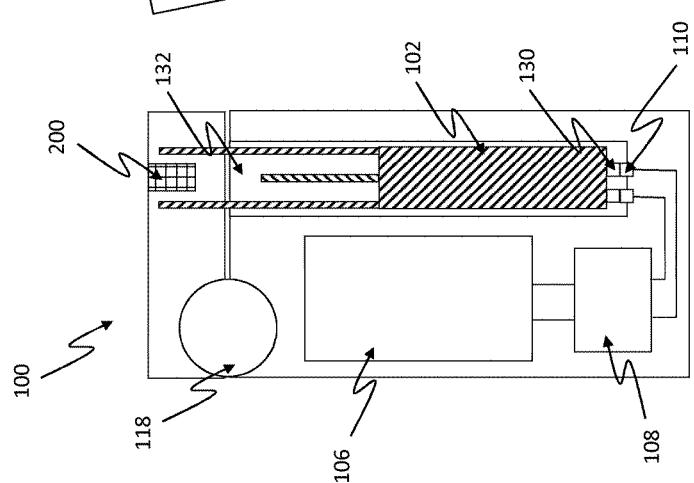

AEROSOL-GENERATING DEVICE AND SYSTEM

The present invention relates to an aerosol-generating device for use in an aerosol-generating system. The system comprises a primary device for receiving the aerosol-generating device to provide power to the device to charge a power supply such as a battery.

Electrically operated smoking systems significantly reduce sidestream smoke, as compared to lit-end smoking devices, while permitting a consumer to selectively activate the smoking system during the smoking experience. Electrically operated smoking systems typically include an aerosol-generating device having a housing for receiving an aerosol-generating article or a smoking article, heating elements to generate an aerosol, a power source and the necessary electronic circuitry. The circuitry may be, for example, circuitry for controlling the heating and charging of the aerosol-generating device. Having a portable device and primary charging device provides the advantage of a small aerosol-generating device being the portable device that is easy to hold and use, but also the ability to quickly and conveniently recharge the aerosol generating device for repeated use.

WO2013/102612 discloses an example of an electrical system comprising a primary device and a secondary, aerosol-generating, device. The primary device comprises a cavity configured to receive the secondary device to allow charging of the secondary device.

It has been found that the aerosol-generating device may be inserted incorrectly into the primary, charging, device which may damage the aerosol-generating device or the primary, charging, device. In addition, inserting the device incorrectly may result in the device not being charged, providing the user with an unsatisfactory experience.

It is therefore an object of the present invention to provide an aerosol-generating device and system which prevents the aerosol-generating device from being inserted into the primary device incorrectly.

According to one aspect of the present invention, there is provided an electrically heated aerosol-generating system comprising a primary device and a secondary, aerosol-generating, device having a cavity at a proximal end for receiving an aerosol-generating substrate, and a distal end. The primary device comprises: a housing; a power supply; a cavity in the housing configured to receive the secondary device; a plurality of electrical contacts within the cavity each contact configured to contact a corresponding contact of the secondary device when the secondary device is in the cavity, at least one of the contacts being connected to the power supply; and a lid configured to cover the opening of the cavity, moveable between a first, closed, position, and a second, open, position. The lid further comprises a protrusion, having a maximum width less than the diameter of the cavity of the secondary device, such that when the secondary device is provided in the cavity of the primary device, distal end first, the protrusion extends into the cavity of the secondary device when the lid is in the first position, and such that when the secondary device is provided in the cavity, proximal end first, the protrusion engages with a distal end of the secondary device to prevent the lid from moving to the first position.

By providing a lid having a protrusion which engages with the aerosol-generating device, if the secondary, aerosol-generating, device is inserted incorrectly, preventing the lid from closing properly, advantageously, the user is provided with a visual cue that the secondary device is inserted incorrectly. In addition, such a protrusion reduces the risk of damaging the primary or secondary device due to incorrect insertion of the secondary device.

Preferably, the protrusion in the lid is resilient. Providing a resilient protrusion may reduce the risk of the secondary device being damaged when the user attempts to close the lid when the secondary device is inserted incorrectly. The resilient protrusion will deform and thus provides the user with haptic feedback.

As used herein, the term 'resilient' relates to an element that may be deformed or deflected by an applied force, but is capable of returning to its original position or state after the applied force is removed. When a resilient element is deformed or deflected by a force applied by a component moving towards the resilient element, the resilient element generates a reactive force that urges the component to move away from the resilient element. Examples of resilient elements include helical springs, cantilever springs, and solid elements that are resilient due to the material they are formed from. In one preferred embodiment, the resilient protrusion is formed from rubber.

The protrusion may be an electrical insulator. Forming the protrusion from an electrical insulator may reduce the risk of electrically shorting the secondary device electrical contacts, and thus damaging the secondary device.

In one embodiment, the protrusion comprises a switch for activating a user indicator as the protrusion engages the distal end of the secondary device. The switch may be a mechanical or an electrical switch. Where a mechanical switch is provided, the switch may activate a flap, or the like, to provide a prominent visual indicator to the user. The flap preferably protrudes from the lid. Where an electrical switch is provided, the switch may activate a visual indicator, an audible indicator, or a tactile indicator, or any combination thereof. The electrical switch is preferably a push to make type switch.

Where present, the visual indicator may be an electrical light. The light may be provided on the lid of the primary device, or on the housing of the primary device. Where present, the audible indicator may be an electrical buzzer, a speaker, or any other suitable device for producing sound. The speaker may emit any appropriate sound, and may include a pre-recorded message. The message may be "Smoking device inserted incorrectly, please re-insert". Where present, the tactile indicator may be a vibrator, configured to vibrate the primary device. The vibrator may be an electric motor coupled to an offset mass.

The primary device may comprise a visual indicator provided on the housing, adjacent the opening of the cavity, such that the visual indicator is visible when the protrusion engages with the distal end of the secondary device to prevent the lid from moving to the first position from the second position. The visual indicator is preferably brightly coloured, such as red. The visual indicator may be a thin wall extending at least partially around the circumference of the cavity. The wall may extend around the whole circumference.

The primary device may include a display (for example a digital display) indicating information to the user. The display may indicate whether the secondary device is inserted correctly. For example, the display may indicate smoking article consumption, energy usage or other information. The display may further indicate when the secondary power supply has sufficient charge to be used to consume a smoking article.

Preferably, the cavity is an elongate cavity extending from the top of the primary device. The length of the cavity from its open end to its closed end is preferably at least as long as the secondary device. The cavity may be offset from the central longitudinal axis of the housing. Preferably, the cavity is adjacent an edge of the housing.

Preferably, the primary device comprises two electrical contacts, a first electrical contact being connected to the positive terminal of the power supply, and a second electrical contact being connected to the negative terminal of the power supply.

The electrical contacts are preferably made from metal. Preferably, the metal used to make the electrical contacts is copper beryllium. Preferably, at least a portion of the electrical contact is gold plated.

Preferably, the source of electrical power comprises a rechargeable battery. Preferably, the primary device comprises means for receiving external electrical power to recharge the rechargeable battery.

Preferably, the electrical power supply device is configured to provide power to the secondary device in a manner suitable to recharge a secondary battery in the secondary device.

The housing preferably comprises a front wall, a back wall, a bottom wall, a top wall, a first side wall and a second side wall.

The terms "front", "back", "upper, "lower", "side", "top", "bottom", "left", "right" and other terms used to describe relative positions of the components of the primary device and secondary device refer to the primary device in an upright position with the opening of the cavity configured to receive the secondary device at the top end.

The term "longitudinal" refers to a direction from bottom to top or vice versa. The term "transverse" refers to a direction perpendicular to the longitudinal direction.

The primary device may be a substantially rectangular parallelepiped comprising two wider walls spaced apart by two narrower side walls and top and bottom walls. The secondary device is preferably elongate.

The lid is preferably a hinge lid. Preferably, the hinge extends across the top of the housing from the front wall to the back wall. The hinge may comprise a spring configured to retain the lid in the second, closed, position. The hinge may also comprise a damper configured to damp the motion of the lid when the lid is moved from the second position to the first position. Alternatively, the hinge may comprise a spring configured to retain the lid in the second position. In this alternative, the lid is preferably provided with means for retaining the lid in the first position, the retaining means being configured to provide sufficient force to overcome the force applied to the lid by the spring.

The retaining means may comprise at least one magnet and at least one corresponding ferrous element. The at least one magnet being provided in the housing of the primary device, and the ferrous element being provided in the lid. Alternatively, the retaining means may be a latch type arrangement.

The hinge lid may form the entire top of the housing. In this alternative, the hinge may be internal to the lid, and be adjacent a side wall of the housing.

The secondary device is an electrically heated aerosol-generating device. The aerosol-generating device is designed to receive an aerosol generating article and be held by a user during the smoking experience. A power supply is preferably provided in the secondary device and is adapted to heat up the aerosol-forming substrate to operating temperature before aerosol generating begins. The power supply in the secondary device is also adapted to maintain the temperature of the aerosol-forming substrate during the aerosol generation. The source of electrical power in the primary device is preferably used to charge the secondary power supply during a charging mode when the secondary device is not in use.

The secondary device, in the form of an electrically heated aerosol-generating device, is preferably of a similar size to or slightly larger than a lit-end cigarette. Thus, the secondary unit can be held between the user's fingers in a similar way to a lit-end cigarette.

As used herein, an 'aerosol-generating device' relates to a device that interacts with an aerosol-forming substrate to generate an aerosol. The aerosol-forming substrate may be part of an aerosol-generating article, for example part of a smoking article. An aerosol-generating device may comprise one or more components used to supply energy from a power supply to an aerosol-forming substrate to generate an aerosol. For example, an aerosol-generating device may be a heated aerosol-generating device. An aerosol-generating device may be an electrically heated aerosol-generating device or a gas-heated aerosol-generating device. An aerosol-generating device may be a smoking device that interacts with an aerosol-forming substrate of an aerosol-generating article to generate an aerosol that is directly inhalable into a user's lungs thorough the user's mouth.

As used herein, the term 'aerosol-forming substrate' relates to a substrate capable of releasing volatile compounds that can form an aerosol. Such volatile compounds may be released by heating the aerosol-forming substrate. As an alternative to heating or combustion, in some cases volatile compounds may be released by a chemical reaction or by a mechanical stimulus, such as ultrasound. An aerosol-forming substrate may be solid or liquid or comprise both solid and liquid components. An aerosol-forming substrate may be adsorbed, coated, impregnated or otherwise loaded onto a carrier or support. An aerosol-forming substrate may conveniently be part of an aerosol-generating article or smoking article.

An aerosol-forming substrate may comprise nicotine. An aerosol-forming substrate may comprise tobacco, for example may comprise a tobacco-containing material containing volatile tobacco flavour compounds which are released from the aerosol-forming substrate upon heating. In preferred embodiments an aerosol-forming substrate may comprise homogenized tobacco material, for example cast leaf tobacco. An aerosol-forming substrate may comprise at least one aerosol-former, such as propylene glycol or glycerine.

As used herein, the terms 'aerosol-generating article' and 'smoking article' refer to an article comprising an aerosol-forming substrate that is capable of releasing volatile compounds that can form an aerosol. For example, an aerosol-generating article may be a smoking article that generates an aerosol that is directly inhalable into a user's lungs through the user's mouth. An aerosol-generating article may be disposable. The term 'aerosol-generating article' is generally used hereafter.

Preferably an aerosol-generating article is a heated aerosol-generating article, which is an aerosol-generating article comprising an aerosol-forming substrate that is intended to be heated rather than combusted in order to release volatile compounds that can form an aerosol. The aerosol formed by heating the aerosol-forming substrate may contain fewer known harmful constituents than would be produced by combustion or pyrolytic degradation of the aerosol-forming substrate. An aerosol-generating article may be, or may comprise, a tobacco stick.

Preferably, the secondary device is configured to operate in at least two modes. The at least two modes are preferably a charging mode, and an operating mode. The charging mode is preferably only accessible when the secondary device is within the primary device and the lid is in the second position. The operating, that is to say aerosol generating mode is preferably only available when the secondary device is not within the primary device.

Preferably, the secondary power supply is chargeable by the primary power supply, during the charging mode, so that the secondary power supply has sufficient charge to maintain the temperature of the aerosol-forming substrate at substantially the operating temperature during the smoking mode. If an optimum temperature is not reached then the amount and quality of an aerosol generated during operation of the device may be diminished. For example, different proportions of volatile elements may be generated when the heating element heats an aerosol-forming substrate to a lower temperature compared to when the substrate is heated to an optimum temperature, and this may alter the flavour of the aerosol. In order to deliver a more optimal and consistent user experience, it may be preferred that the secondary device can only be operated when the secondary power supply is in a fully charged condition. In the fully charged condition the secondary power supply should always be capable of heating the aerosol-forming substrate to an optimum temperature. As every operation of the secondary device will consume power from the secondary power supply, it may be preferred that the secondary device needs to be recharged before each operation. For example, an aerosol-generating device may be required to be recharged after every actuation before another smoking article can be consumed.

Insufficient charge may also result in an unsatisfactory user experience if the secondary device fails to have sufficient charge to heat the aerosol forming substrate over a time period sufficient to exhaust or substantially deplete the substrate of any aerosol that might be formed. Accordingly, in one embodiment the secondary device will prevent a user from beginning operation of the device unless sufficient power is available to complete an aerosol generating cycle. For example, if the aerosol generating is a smoking article including a tobacco based aerosol forming substrate, the secondary device may not permit a smoking experience unless sufficient power is present to maintain an operating temperature for at least 6 minutes.

Preferably, supply of electrical power from the primary power supply to the at least one heating element, during a pre-heating mode, is controlled by the secondary circuitry in the secondary device. Supply of electrical power from the primary power supply, during the charging mode, to charge the secondary power supply, may be controlled by the secondary circuitry in the secondary device.

The secondary device may be keyed to the cavity of the primary device such that only a secondary device compatible with the primary device can be inserted into the cavity. To effect the keying of the secondary device to the cavity of the primary device, the cavity may be provided with a specific non-regular shape, and the secondary device may be provided with a corresponding non-regular shape. In addition, to ensure the secondary device is inserted into the cavity in the correct orientation, the non-regular shape is preferably not rotationally symmetrical. As such, the secondary device may only be inserted into the cavity in one orientation.

The primary device may further comprise at least one contact configured to transfer data between the primary device and the secondary device. Preferably, the primary device further comprises at least two contacts configured to transfer data between the primary device and the secondary device. The primary device is preferably configured to only transfer data to, or receive data from, the secondary device when the lid is in the second position.

Data may be communicated between both the secondary and primary device, as well as from the primary device to a computer interface capable of being read by a computer or other electronic device capable of transferring data to a computer or the internet. Preferably, the data connection operates under an interface standard. An interface standard is a standard that describes one or more functional characteristics, such as code conversion, line assignments, or protocol compliance, or physical characteristics, such as electrical, mechanical, or optical characteristics, necessary to allow the exchange of information between two or more systems or pieces of equipment. Examples of suitable interface standards for the communications link include, but are not limited to, the Recommended Standard 232 (RS-232) family of standards; USB; Bluetooth; FireWire (a brand name of Apple, Inc for their IEEE 1394 interface), IrDA (Infrared Data Association—a communications standard for the short-range exchange of data by Infrared light); Zigbee (a specification based on the IEEE 802.15.4 standard for wireless personal area networks) and other Wi-Fi standards.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco. Optionally, the solid substrate may contain additional tobacco or non-tobacco volatile flavour compounds, to be released upon heating of the substrate. Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix. The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavour delivery during use. Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

The aerosol-forming substrate may be a liquid substrate and the smoking article may comprise means for retaining the liquid substrate. The aerosol-forming substrate may alternatively be any other sort of substrate, for example, a gas substrate, or any combination of the various types of substrate.

The primary device may include storage means for at least one aerosol generating article, such as a smoking article including a tobacco aerosol forming substrate. The storage means may include storage for used smoking articles, unused smoking articles or both. This is advantageous since the primary device and secondary unit together provide all the components required for the smoking mode.

As used herein, means plus function features may be expressed alternatively in terms of their corresponding structure.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention will be further described, by way of example only, with reference to the accompanying drawings in which:

FIG. 1 show a primary device and secondary device;

FIG. 2 shows a primary device with a secondary device correctly inserted therein;

FIG. 3 shows a primary device with a secondary device incorrectly inserted therein; and FIG. 4 shows a lid of a primary device having a protrusion.

FIG. 1(a) shows a primary device 100. The primary device 100 in this example is a charging unit for an electrically heated smoking system. FIG. 1(b) shows a secondary device 102. The secondary device 102 in this example is an electrically heated aerosol-generating device adapted to receive a smoking article 104 comprising an aerosol-forming substrate. The primary device 100 comprises a primary battery 106, control electronics 108, and electrical contacts 110 configured to provide electrical power to the secondary device, from the battery 106, when the secondary device is in connection with the electrical contacts 110. The primary device is configured to charge the secondary device utilizing the battery 106. The electrical contacts 110 are provided adjacent the bottom of a cavity 112. The cavity is configured to receive the secondary device 102. A lid 114 is provided that is configured to secure the secondary device 102 within the cavity 112 of the primary device 100. The components of the primary device 100 are housed within the housing 116. The lid 114 is coupled to the housing 116 by hinge 118. The operation of the lid is described in further detail below.

In addition, the primary device 100 is provided with a series of three indicators 120, 122 and 124. The indicator 120 is provided to indicate the level of charge remaining in the primary battery 106. The indicator 120 is configured to indicate the percentage of the charge remaining in the primary battery. For example, 100% would indicate that the battery 106 is fully charged, and 50% would indicate that the battery 106 is half charged.

The second indicator 122 is provided to indicate that the secondary device 102 is fully charged, and ready to be used to generate an aerosol. The indicator 122 only indicates this state of readiness once the secondary device is capable of providing sufficient power to provide the user with a complete smoking experience; for example, sufficient power to aerosolise the entire aerosol forming substrate 104, or sufficient power to generate a predetermined number of puffs. In one embodiment, the secondary device 102 cannot be operated unless the rechargeable battery 126 is fully charged.

The third indicator 124 is provided to indicate that the secondary device is being cleaned. The aerosol generating article may leave behind a residue on the heater of the aerosol-generating device, and so the primary device may be provided with a cleaning mode, which provides power to the heater when the secondary device is received in the cavity. The power provided to the heater in the cleaning mode is sufficient to burn off the residue.

The secondary device 102 comprises a rechargeable battery 126, secondary control electronics 128 and electrical contacts 130. As described above, the rechargeable battery 126 of the secondary device 102 is configured to receive a supply of power from the primary battery 106 when the electrical contacts 130 are in contact with the electrical contacts 110 of the primary device 100 and the lid is in the closed position. The secondary device 102 further comprises a cavity 132 configured to receive the aerosol generating article 104. A heater 134, in the form of, for example, a blade heater, is provided at the bottom of the cavity 132. In use, the user activates the secondary device 102, and power is provided from the battery 126 via the control electronics 128 to the heater 134. The heater is heated to a standard operational temperature that is sufficient to generate an aerosol from the aerosol-forming substrate of the aerosol-generating article 104. The components of the secondary device 102 are housed within the housing 136.

Finally, the primary device 100 is provided with further electrical contacts 138 configured to enable the primary device to be connected to an external power supply to enable the battery 106 to be recharged.

FIG. 2 shows the secondary device 102 correctly received in the cavity of the primary device 100. As described above, the electrical contacts 130 of the secondary device 102 are coupled to the electrical contacts 110 of the primary device 100 to enable the primary power supply 106 to recharge the secondary power supply 126.

As can be seen in FIG. 2, the lid 114, which in this example extends across the whole of the top of the primary device, comprises a resilient protrusion 200. When the secondary device 102 is received in the cavity 112 in the correct orientation, the protrusion 200 extends into the cavity 132 of the secondary device. As will be appreciated, if the secondary device has an aerosol generating article inserted into the cavity 136, the protrusion will engage with the article and prevent the lid from closing properly. This feature prevents the primary device from either recharging, or more importantly cleaning the secondary device when an article is within the cavity of the secondary device because the primary device is configured to prevent power being supplied to the secondary device when the lid is not closed.

FIG. 3 shows the secondary device 102 incorrectly received in the cavity of the primary device. When the secondary device is received incorrectly, the resilient protrusion 200 engages with the distal end 300 of the secondary device to prevent the lid from closing properly. This provides a visual indicator to the user to show that the secondary device is inserted incorrectly, and so the device will not be recharged, or cleaned. The user will thus be prompted to insert the device correctly.

The resilient protrusion may comprise a switch, activated when the protrusion engages with the distal end 300 of the secondary device 102 to provide a further prompt to the user. For example, the switch may activate a light, or a buzzer or the like.

FIG. 4 shows an isometric view of the lid 114 of the primary device 100 and the resilient protrusion 200 connected to the inside of the top surface thereof. In this example, the protrusion is shown as being cuboid, but it may be any other suitable shape, such as a cylinder or cone.

The invention claimed is:

1. An electrically heated aerosol-generating system comprising a primary device and a secondary, aerosol-generating, device having a cavity at a proximal end configured to receive an aerosol-generating substrate, and a distal end, the primary device comprising:
   a housing;
   a power supply;
   a cavity in the housing configured to removably receive the secondary device;
   a plurality of electrical contacts within the cavity, each contact being configured to contact a corresponding contact of the secondary device when the secondary device is in the cavity, at least one of the contacts being connected to the power supply; and
   a lid configured to cover an opening of the cavity, and being moveable between a first closed position and a second open position,
   wherein the lid comprises a protrusion having a maximum width less than a diameter of a cavity of the secondary device,
      such that when the secondary device is provided in the cavity of the primary device, distal end first, the protrusion extends into the cavity of the secondary device when the lid is in the first position, and
      such that when the secondary device is provided in the cavity of the primary device, proximal end first, the protrusion engages with a distal end of the secondary device to prevent the lid from moving to the first position.

2. The electrically heated aerosol-generating system according to claim 1, wherein the protrusion is resilient.

3. The electrically heated aerosol-generating system according to claim 1, wherein the protrusion is an electrical insulator.

4. The electrically heated aerosol-generating system according to claim 1, further comprising a user indicator, wherein the protrusion comprises a switch configured to activate the user indicator as the protrusion engages the distal end of the secondary device.

5. The electrically heated aerosol-generating system according to claim 4, wherein the user indicator includes a visual indicator.

6. The electrically heated aerosol-generating system according to claim 4, wherein the user indicator includes an audible indicator.

7. The electrically heated aerosol-generating system according to claim 1, further comprising a visual indicator provided on the housing, adjacent the opening of the cavity of the primary device, such that the visual indicator is visible when the protrusion engages with the distal end of the secondary device.

* * * * *